A. L. McGREGOR.
AUTOMOBILE BUMPER.
APPLICATION FILED MAR. 24, 1920.
1,369,254.
Patented Feb. 22, 1921.
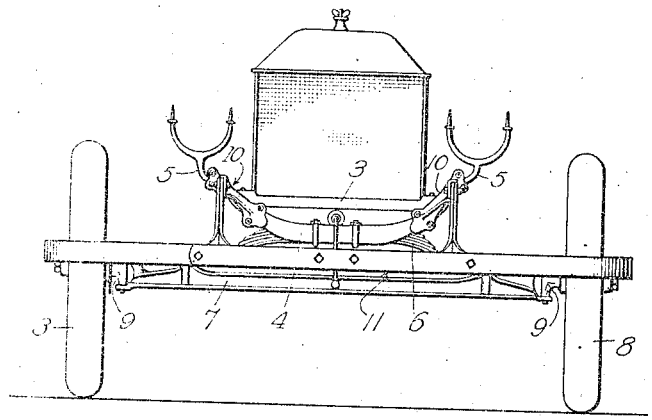
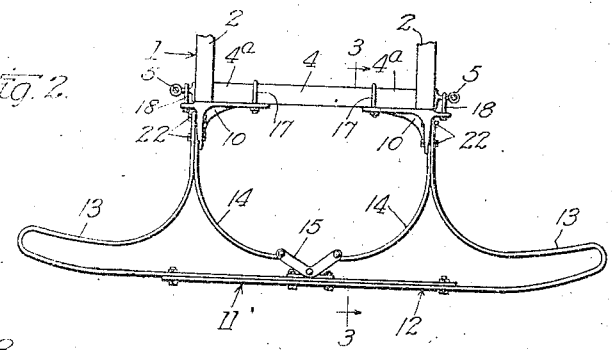
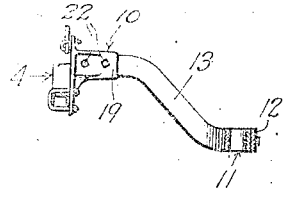
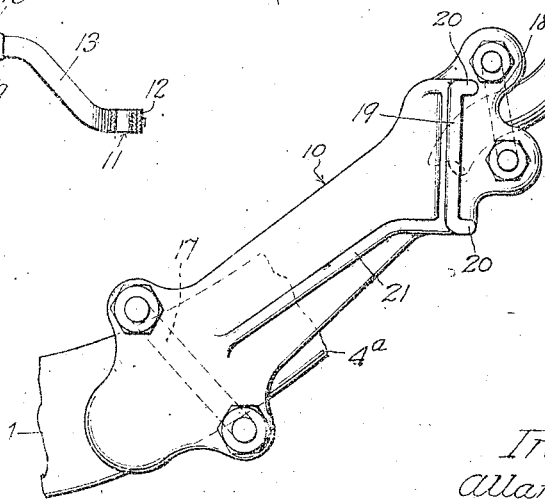
Inventor
Allan L. McGregor
Offield, Poole & Hinton
Attys.

UNITED STATES PATENT OFFICE.

ALLAN L. McGREGOR, OF CHICAGO, ILLINOIS.

AUTOMOBILE-BUMPER.

1,369,254.	Specification of Letters Patent.	Patented Feb. 22, 1921.

Application filed March 24, 1920. Serial No. 368,466.

*To all whom it may concern:*

Be it known that I, ALLAN L. MCGREGOR, a citizen of the United States, and a resident of Chicago, in the county of Cook and State of Illinois, have invented certain new and useful Improvements in Automobile-Bumpers, of which the following is a specification.

This invention relates to improvements in automobile bumpers and more particularly to a bumper structure adapted for use with that make of automobile known as a Ford, or other motor vehicles having similar construction of chassis.

The chassis of the Ford automobile, as well known in the art, differs materially from the standard chassis construction employed in nearly all other makes of automobiles, one of these differences being in the frame construction, namely, in that the longitudinal frame members or sills terminate immediately above the front axle instead of extending some distance beyond, as in the standard motor vehicle frame. These longitudinal sills are joined together at their forward ends by a transverse frame member likewise located above the front axle, and it is to this transverse frame member that a bumper structure can be attached in a practical manner. By reason, therefore, of the particular construction found in a Ford automobile, the problem in providing a suitable bumper for such vehicles involves the locating of the impact member in the usual position forwardly of the front wheels and substantially in horizontal alinement with the axles thereof, and at the same time providing proper support for the impact member which involves the provision of suitable connecting members or parts between the impact bar and the supporting brackets which will overcome the disadvantages that would ordinarily arise owing to the increased distance between the impact bar and the points of connection with the vehicle frame, and the dropping of the impact bar the necessary distance below the points of connection.

The features embodied in the bumper structure calculated to fulfil the requirements hereinbefore suggested, are more fully described in the following specification and as illustrated in the accompany drawings, in which—

Figure 1 is a front view in elevation of a Ford chassis with the bumper attached thereto, Fig. 2 is a top plan view of the bumper structure and portions of the chassis to which the same are attached, Fig. 3 is a detail view in cross-section taken on line 3, 3 of Fig. 2, and Fig. 4 is an enlarged view in front elevation of one of the attaching brackets and parts of the chassis to which it is secured, with the bumper removed.

Considering a Ford chassis as typical of the type of vehicles to which the bumper of my present invention is more particularly adapted, the same comprises a frame 1 consisting of the longitudinal sills 2, 2 and a transverse sill 3, this frame 1 being supported at its forward end upon a transverse saddle-like member 4 located immediately below the transverse frame member 3 and having upwardly and outwardly inclined end portions 4ª terminating immediately below the sills 2, 2, and ordinarily having fixed at their ends laterally extending lamp brackets 5, 5. The transverse member 4 is shackled to the front spring 6 which in turn is connected to the front axle 7, to the ends of which are journaled the wheels 8, 8 through the medium of intermediate spindles 9, 9.

Describing more generally the structural features of the bumper, the same comprises two brackets 10, 10 which may be described in a general way as having the form of elongated plates adapted to be clamped flatwise and longitudinally of the inclined end portions 4ª, 4ª of the frame member 4. The bumper proper consists of an impact bar 11 formed of resilient bar material so constructed that the bar will be yieldable in a horizontal direction and relatively nonyieldable in a vertical direction. As a preferable construction, the impact member is made up of two sections or portions which overlap throughout a considerable distance intermediate their ends and bolted together, forming a central impact portion 12 of double thickness. These portions extend laterally beyond the central portion 12 and form the end sections 13, 13, the material being bent rearwardly and inwardly in U-shape, thereby forming the extremities of the bumper, the portions immediately beyond the U-shaped extremities being bent rearwardly through an arc of substantially 90 degrees, and having a comparatively long radius, thus giving these members rather extended length. The rear or free ends of the end portions 13 are rigidly secured to the brackets 10, 10 in a manner hereinafter more fully set forth. It will be observed from Fig. 1 that the impact member 11 is offset downwardly a considerable distance from the brackets 10, 10, this being due to the peculiar construction of the chassis and the necessity of locating the impact member substantially forward of the wheels 8, 8. To accomplish the vertical offsetting of the impact bar 11, the end portions 13, 13 are bent or distorted throughout their rear portions much in the manner as shown in Fig. 3, the amount of bending or distortion being sufficient to provide the necessary degree of offset and at the same time provided parallel end portions adjacent the ends of said end portions.

In addition to the impact bar 11 and its integral end portions 13, 13, the bumper includes two auxiliary bars 14, 14, these bars extending from the brackets 10, 10 forwardly and inwardly with curvilinear contour toward the central portion of the impact bar 11. These bars 14, 14 terminate at a short distance rearwardly from said impact bar 11 and in laterally spaced relation from each other, and are joined together and connected to the impact bar by means of a bell crank lever 15, pivotally mounted on a plate 16 bolted to the impact bar 11. The auxiliary bars 14, 14 and the end portions 13, 13 have substantially the same arc of curvature meeting each other tangentially at a point forward of the brackets 10, 10 and from that point on have flatwise contact with each other and are joined together as well as secured to the brackets 10, 10 by the same connecting means. So, also, the auxiliary bars 14, 14 are bent or distorted to the same degree as are the end portions 13, 13 and hence are provided with the same degree of vertical offset throughout their free end portions.

Referring now more in detail to the attaching brackets 10, 10, the same have the general form of elongated plates, as before suggested, which extend along the upwardly inclined portions 4ª, 4ª of the frame member 4 and lie flatwise against the forward face thereof and are clamped at their lower ends to said frame member 4 by means of the ordinary form of U-bolt 17, 17. The upper ends of the brackets 10, 10, extend slightly beyond the ends of the portions 4ª, 4ª of the frame 4 and terminate adjacent to the base of the lamp brackets 5, 5. Similar U-bolts 18, 18 are mounted at the outer ends of the brackets and pass around the lamp brackets 5, 5 and form a rigid connection therebetween. Integral with each attaching bracket 10 is a transversely extending arm 19 having upper and lower marginal flanges 20 and a reinforcing flange 21 extending longitudinally of the bracket and joining the flange at its lower edge. The flange 19 is located in close proximity to the upper end of the bracket and it is to this member that the free ends of the end sections 13 of the impact bar 11 and the auxiliary bars 14, 14 are secured, this being accomplished by means of pairs of bolts 22, 22.

Having described a preferred form of a bumper structure embodying my invention, among the several advantages may be pointed out the desired degree of rigidity and strength that is afforded without sacrificing the shock-absorbing qualities of the structure. Inasmuch as the impact bar is spaced a considerable distance forwardly of the points at which it is attached to the frame, it is obvious that there would be a tendency for vertical vibration of the bumper in the movement of the vehicle over rough roads and pavements. By providing the auxiliary bars 14, 14, the structure is materially strengthened, particularly throughout the parts adjacent to the attaching brackets so that a comparatively rigid structure is provided at the point where vibrations would originate.

Furthermore, due to the extreme transverse dimension of the structure, the tendency for the same to become distorted is obviously increased, and this tendency is overcome by the auxiliary bars 14, 14 which act to reinforce the impact member 11 as well as the end portions 13, 13 thereof. The presence of the bell crank lever, pivotally mounted as it is to the impact bar, serves as an equalizing medium whereby shocks received at one point along the impact bar would be uniformly distributed throughout the remaining parts of the bumper, thereby decreasing the force of the blow at the actual point of contact and lessening the possibility of a permanent distortion at that point as well as assuring the prompt recovery of all parts to their normal positions immediately after the impact is received. A further feature of the device is its adaptability to Ford automobiles and similarly designed vehicles, which do not lend themselves to the attachment of protective devices. Therefore, the provision of a suitable bracket which may be securely and conveniently mounted upon the frame, and which is capable of properly supporting the bumper materially promotes the practicability of the device.

Although I have described and illustrated a definite structure embodying my invention, it is to be understood that the same may be variously modified without departing from the spirit of the invention, and for that reason I do not wish to be limited except in so far as the invention is more fully set forth in the appended claims.

I claim as my invention:

1. In an automobile bumper, the combination of brackets adapted for attachment to a vehicle frame, and a bumper structure comprising a transverse impact member disposed at a comparatively long distance forwardly of said brackets and curvilinear end sections extending laterally inward and rearward and rigidly connected at their free ends to said brackets, said end sections being offset vertically intermediate their ends.

2. In an automobile bumper, the combination with a transverse frame member, of an impact member comprising end sections extending rearwardly to the vehicle frame, reinforcing members extending rearwardly from the central portion of said impact member and joining the end sections adjacent their free ends, and brackets adapted for attachment to said frame member and connected with the free ends of said end sections and reinforcing members.

3. In an automobile bumper, the combination of attaching brackets adapted to be clamped to a vehicle frame, an impact bar having end sections extending inwardly and rearwardly and attached at their free ends to said brackets, and a reinforcing bar extending outwardly and rearwardly from the central portion of said impact bar and attached to said brackets, said end sections and reinforcing bars being offset vertically intermediate their ends.

4. In an automobile bumper, the combination with a vehicle frame having a transverse sill, of a bumper structure comprising attaching brackets adapted to be clamped flatwise against said sill, an impact bar comprising end sections extending inwardly and rearwardly, and attached at their free ends to said brackets, and reinforcing bars pivotally mounted at the central portion of said impact bar and extending rearwardly, meeting said end sections adjacent the ends thereof.

5. In an automobile bumper, the combination with a vehicle frame having a transverse forward frame member, a transverse impact bar having relatively long end sections extending rearwardly from said impact bar, brackets adapted to be clamped to said frame member and fixed to the free ends of said end sections, and reinforcing members connecting the central portion of said impact member with said brackets.

6. In an automobile bumper, the combination with a vehicle frame having a transverse frame member with upwardly inclined end portions, of a bumper structure comprising a transverse impact member disposed at a comparatively long distance forwardly of and offset vertically below said frame member, end sections extending laterally inward and rearward, and brackets clamped flatwise along the inclined portions of said transverse frame member, said end sections being secured at their free ends to said brackets and having vertically offset portions intermediate their ends.

7. In an automobile bumper, the combination with a transverse frame member, of an impact member comprising end sections curved inwardly and extending rearwardly toward the vehicle frame, reinforcing members curved outwardly and rearwardly from the central portion of said impact member and joining the end sections adjacent their free ends, and brackets adapted for attachment to said frame member and connected with the free ends of said end sections and reinforcing members, the same being vertically offset intermediate their ends.

In witness whereof, I hereunto subscribe my name this 20th day of March, A. D. 1920.

ALLAN L. McGREGOR.